(12) United States Patent
Knudsen et al.

(10) Patent No.: US 8,409,680 B2
(45) Date of Patent: Apr. 2, 2013

(54) POLYAMIDE-POLYDIENE BLENDS WITH IMPROVED OXYGEN REACTIVITY

(75) Inventors: Ricardo Knudsen, Sao Paulo (BR); Jeffrey D. Black, Akron, OH (US)

(73) Assignee: M&G USA Corporation, Apple Grove, WV (US)

( * ) Notice: Subject to any disclaimer, the term of this patent is extended or adjusted under 35 U.S.C. 154(b) by 55 days.

(21) Appl. No.: 12/787,551

(22) Filed: May 26, 2010

(65) Prior Publication Data

US 2010/0316824 A1 Dec. 16, 2010

Related U.S. Application Data

(60) Provisional application No. 61/186,271, filed on Jun. 11, 2009.

(51) Int. Cl.
*B29D 22/00* (2006.01)
*C08K 3/08* (2006.01)
*C08K 3/10* (2006.01)

(52) U.S. Cl. .................. 428/36.9; 428/35.8; 264/209.1; 524/435

(58) Field of Classification Search ................. 428/36.9, 428/35.8; 264/209.1; 524/435
See application file for complete search history.

(56) References Cited

U.S. PATENT DOCUMENTS

| 6,353,050 B1 | 3/2002 | Bastiaens et al. |
| 7,919,159 B2 * | 4/2011 | Liu et al. ...................... 428/34.1 |
| 2003/0045640 A1 | 3/2003 | Akkapeddi et al. |
| 2006/0246245 A1 | 11/2006 | Zhenguo et al. |
| 2008/0048368 A1 * | 2/2008 | Hirota et al. .................. 264/529 |
| 2012/0034355 A1 * | 2/2012 | Embs ........................... 426/399 |

FOREIGN PATENT DOCUMENTS

WO 2007042230 A1 4/2007

OTHER PUBLICATIONS

"Evaluation of Polybutadiene Scavengers and Nylon Scavengers in the Presence of Sulfoisophthalic Acid" Research Disclosure, vol. 540, No. 001, Feb. 25, 2009, XP002593744; whole document.

* cited by examiner

*Primary Examiner* — Tae H Yoon
(74) *Attorney, Agent, or Firm* — Edwin A. Sisson, Attorney at Law, LLC

(57) ABSTRACT

This application discloses the use of polyamide-polydiene blends to improve the oxygen reactivity in the presence of ionic polyester compatibilizers.

12 Claims, 2 Drawing Sheets

POLYAMIDE-POLYDIENE BLENDS WITH IMPROVED OXYGEN REACTIVITY

PRIORITY AND CROSS REFERENCES

This application claims priority from U.S. Provisional Application 61/186,271 filed on 11 Jun. 2009, the teachings of which are incorporated in their entirety.

BACKGROUND

The use of ionic compatibilizers to compatibilize nylons in PET barrier bottles is known in the art. The use of cobalt with nylon is known in the art, as well as the use of ionic compatibilizers, cobalt and nylon in PET barrier bottles.

It is also known to use cobalt salts in the presence of polybutadiene reacted with PET to create barrier bottles.

WO0183318 describes the reaction of nylon with polybutadiene to create an oxygen scavenging compound to be blended with PET and cobalt.

However, it is known from the "Evaluation of polybutadiene scavengers and nylon scavengers in the presence of sulfoisopthalic acid" published electronically in Research Disclosures 25 Feb. 2009 that the polyamide cobalt salts mixture has a very long induction period to the reaction with oxygen when in the presence of ionic compatibilizers. It is also know that polybutadienes in the presence of cobalt salts and ionic compatibilizers do not react very well with oxygen. According to the disclosure, SIPA quenches the reaction of oxygen with polybutadiene and the reaction of oxygen with MXD6 nylon.

There exists therefore the need of a system which reacts well with oxygen when in the presence of an ionic compatibilizer with faster induction times.

SUMMARY

This specification discloses a composition comprising a polyester, an ionic compatibilizer, a polyamide, a polydiene compound, and a transition metal compound. It further discloses that the ionic compatibilizer can be derived from the salt of sulfoisophthalic acid or its dimethyl ester. It is further disclosed that the ratio of the polyamide to the polydiene compound is in the range of 4:1 and 1000:1. The polydiene may have functional groups and at least some of these groups have reacted with the polyamide. The polyester may be present in range of about 9 to 99.8 weight percent of the total composition.

It is further disclosed that the transition metal compound may be present in range of about 100 to 15,000 ppm metal to the polyamide plus polydiene compound and that the transition metal compound may be a cobalt compound.

DESCRIPTION

Figure 1:
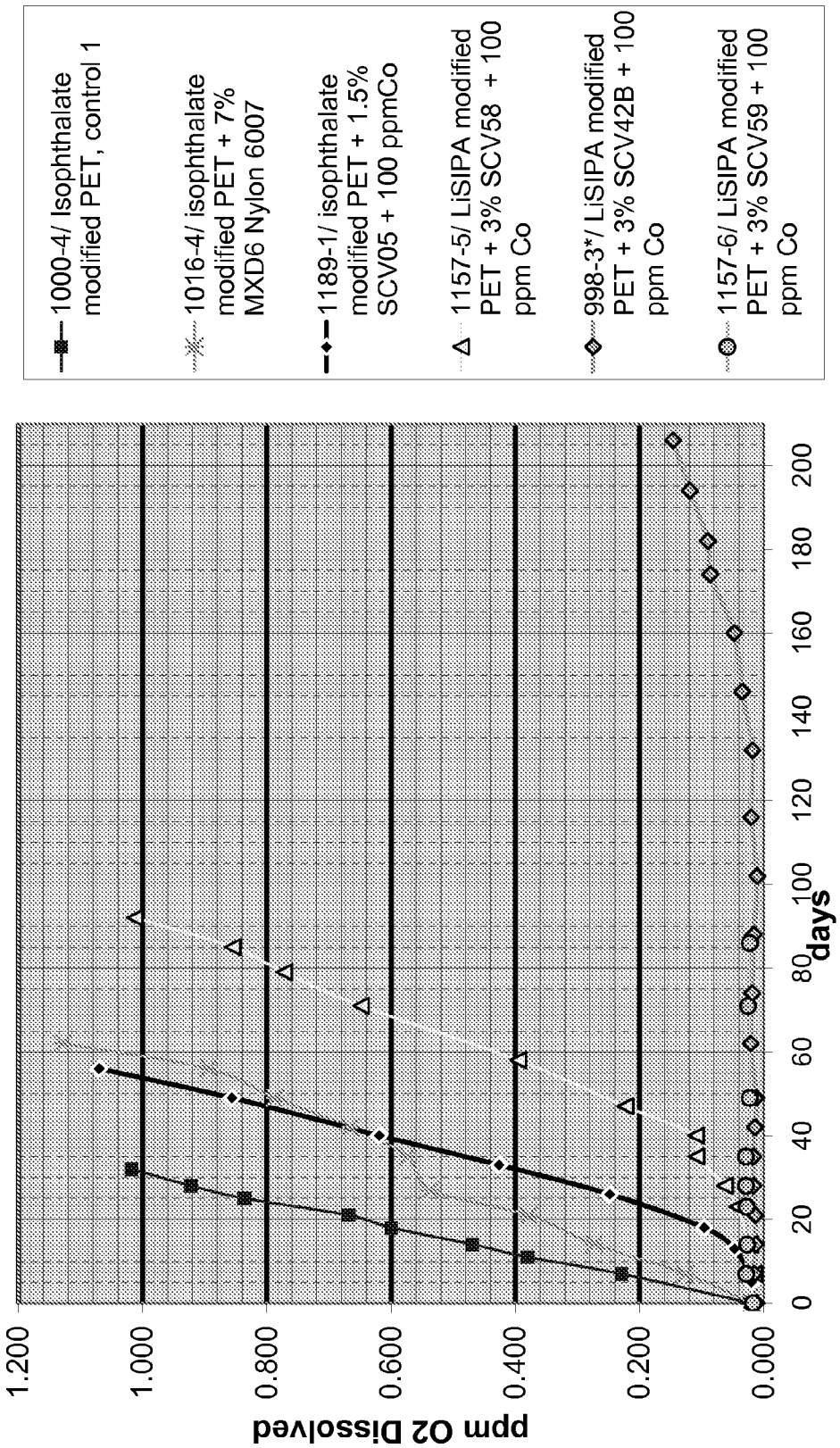
FIG. 1. is a chart showing the amount of oxygen ingress into a package made with various embodiments of the invention and controls.

Described herein is an improved polyester-polyamide composition prepared by combining a polyamide homopolymer, copolymer, or blends thereof, and an oxidizable polydiene or polyether in the presence of a polyester and an ionic compatibilizer. Preferably the composition also comprises a metal carboxylate salt catalyst. Polydiene may also be considered a compound from a diene monomer.

The preferred polyamide homopolymer or copolymer is selected from aliphatic polyamides and aliphatic/aromatic polyamides having a number average molecular weight of from about 2,000 to about 100,000. General procedures useful for the preparation of polyamides are well known to the art. Useful diacids for making polyamides include dicarboxylic acids which are represented by the general formula

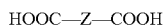

wherein Z is representative of a divalent aliphatic radical containing at least 2 carbon atoms, such as adipic acid, sebacic acid, octadecanedioic acid, pimelic acid, suberic acid, azelaic acid, dodecanedioic acid, and glutaric acid. The dicarboxylic acids may be aliphatic acids, or aromatic acids such as isophthalic acid and terephthalic acid. Suitable diamines for making polyamides include those having the formula

wherein n has an integer value of 1-16, and includes such compounds as trimethylenediamine, tetramethylenediamine, pentamethylenediamine, hexamethylenediamine, octamethylenediamine, decamethylenediamine, dodecamethylenediamine, hexadecamethylenediamine, aromatic diamines such as p-phenylenediamine, 4,4'-diaminodiphenyl ether, 4,4'-diaminodiphenyl sulphone, 4,4'-diaminodiphenylmethane, alkylated diamines such as 2,2-dimethylpentamethylenediamine, 2,2,4-trimethylhexamethylenediamine, and 2,4,4 trimethylpentamethylenediamine, as well as cycloaliphatic diamines, such as diaminodicyclohexylmethane, and other compounds. Other useful diamines include heptamethylenediamine, nonamethylenediamine, and the like.

Useful aliphatic polyamide homopolymers include poly(4-aminobutyric acid) (nylon 4), poly(6-aminohexanoic acid) (nylon 6, also known as poly(caprolactam)), poly(7-aminoheptanoic acid) (nylon 7), poly(8-aminooctanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12), poly(hexamethylene adipamide) (nylon 6,6), poly(hexamethylene sebacamide) (nylon 6,10), poly(heptamethylene pimelamide) (nylon 7,7), poly(octamethylene suberamide) (nylon 8,8), poly(hexamethylene azelamide) (nylon 6,9), poly(nonamethylene azelamide) (nylon 9,9), poly(decamethylene azelamide) (nylon 10,9), poly(tetramethylene adipamide (nylon 4,6), caprolactam/hexamethylene adipamide copolymer (nylon 6,6/6), hexamethylene adipamide/caprolactam copolymer (nylon 6/6,6), trimethylene adipamide/hexamethylene azelaiamide copolymer (nylon trimethyl 6,2/6,2), hexamethylene adipamide-hexamethylene-azelaiamide caprolactam copolymer (nylon 6,6/6,9/6), poly(tetramethylenediamine-co-oxalic acid) (nylon 4,2), the polyamide of n-dodecanedioic acid and hexamethylenediamine (nylon 6,12), the polyamide of dodecamethylenediamine and n-dodecanedioic acid (nylon 12,12), as well as blends and copolymers thereof and other polyamides which are not particularly delineated here.

Of these polyamides, preferred polyamides include polycaprolactam, which is also commonly referred to as nylon 6, and polyhexamethylene adipamide, which is also commonly referred to as nylon 6,6, as well as mixtures of the same. Of these, polycaprolactam is most preferred.

Polyamides used in the practice of this invention may be obtained from commercial sources or prepared in accordance with known preparatory techniques. For example, poly(caprolactam) can be obtained from Honeywell International Inc., Morristown, N.J. under the trademark CAPRON®. Suitable variants of CAPRON® for use as a first polyamide in the present invention include CAPRON® 8200 nylon, a balanced nylon 6 having a formic acid viscosity (FAV) of 75, CAPRON® 1767 nylon, a balanced nylon 6 having an FAV of 35, and CAPRON® 8224HSL nylon, a heat stabilized, lubricated nylon 6 having an FAV of 60. A suitable variant of CAPRON® nylon for use as a second polyamide includes CAPRON® 1250 nylon, an amine-terminated nylon 6 with a FAV of 60 and having terminal amino groups of 70 to 78 milliequivalents per gram.

Exemplary of aliphatic/aromatic polyamides include poly (2,2,2-trimethyl hexamethylene terephthalamide), poly(m-xylylene adipamide) (MXD6), poly(p-xylylene adipamide), poly(hexamethylene terephthalamide) (nylon 6,T), poly(hexamethylene isophthalamide) (nylon 6,I), poly(dodecamethylene terephthalamide), polyamide 6T/6I, poly(tetramethyl-enediamine-co-isophthalic acid) (nylon 4,1), polyamide 6/MXDT/I, polyamide MXDI, hexamethylene adipamide/hexamethylene-isophthalamide (nylon 6,6/6I), hexamethylene adipamide/hexamethyleneterephthalamide (nylon 6,6/6T) and as well as others which are not particularly delineated here.

Blends of two or more aliphatic/aromatic polyamides and/or aliphatic polyamides can also be used. Aliphatic/aromatic polyamides can be prepared by known preparative techniques or can be obtained from commercial sources. Other suitable polyamides are described in U.S. Pat. Nos. 4,826,955 and 5,541,267.

The composition of the current invention also contains a functional, nylon reactive, oxidizable polydiene or polyether as an oxygen scavenger. Such are low molecular weight, small particles which are compatible and uniformly dispersible in the polyamide. Preferably the nylon reactive, oxidizable polydiene or polyether comprises an epoxy or anhydride functionality such that it reacts with the carboxyl or amino end groups of the polyamide. The functionality in the polydiene or polyether may also react with amide group in the polyamide backbone. The functionality can be pendant to the backbone or at the chain ends of the polydiene or polyether. The preferred functional polydienes are functional polyalkadiene oligomers which can have the following general backbone structure

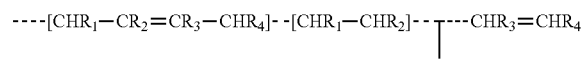

where $R_1$, $R_2$, $R_3$ and $R_4$ can be the same or different and can be selected from hydrogen (—H) or any of the lower alkyl groups (methyl, ethyl, propyl, butyl etc.). $R_2$ & $R_3$ may also be a chloro (—Cl) group. Illustrative of the backbone structure are polybutadiene (1,4 or 1,2 or mixtures of both), polyisoprene (1,4 or 3,4), poly 2,3-dimethyl butadiene, polychloroprene, poly 2,3-dichlorobutadiene, polyallene, poly1,6-hexatriene, etc.

Specific non-limiting examples of functional, oxidizable polydienes as suitable oxygen scavengers include epoxy functionalized polybutadiene (1,4 and/or 1,2), maleic anhydride grafted or copolymerized polybutadiene (1,4 and/or 1,2), epoxy functionalized polyisoprene, and maleic anhydride grafted or copolymerized polyisoprene.

Specific non-limiting examples of functional oxidizable polyethers as oxygen scavengers include amine, epoxy or anhydride functionalized polypropylene oxide, polybutylene oxide (2,3 or 1,2) and polystyrene oxide. The preferred oxygen scavenger is an epoxy functional polybutadiene oligomer. The oxygen scavenger is present in the polyamide composition as a large number of small particles. The number average molecular weight (Mn) of the functional polydiene or polyether oligomer may range from 500 to 7,000, preferably from about 750 to about 3000 and most preferably from about 1000 to about 2000.

It is present as a ratio to the polyamide of about 0.1% to about 10% by weight relative to the polyamide, preferably from about 1% to about 10% and more preferably from about 0.5% to about 5% relative to the weight of the polyamide. The functional, oxidizable polydiene or polyether is in the form of particles whose average particle size is in the range of from about 10 nm to about 1000 nm, wherein the particles are substantially uniformly distributed in the polyamide. Preferably, the particle size should be between 10 nm and 400 nm, with 10 nm to 300 nm more preferred and 10 nm to 200 nm even more preferred with 5 nm to 150 nm being the most preferred.

The composition may comprise either a blend of the polyamide and the polydiene or polyether, or a reaction product of the polyamide with the oxidizable polydiene or polyether.

The polyamide to diene ratio in the composition is about 4:1 to about 1000:1 by weight, preferably from about 10:1 to about 100:1 and more preferably from about 18:1 to about 49:1.

Preferably the composition further comprises a metal fatty acid salt catalyst such as a low molecular weight metal carboxylate salt catalyst. Suitable metal fatty acid salt catalysts have a counterion which is an acetate, stearate, propionate, hexanoate, octanoate, benzoate, salicylate, and cinnamate or combination thereof. Preferably the metal fatty acid salt catalyst is a cobalt, copper or ruthenium, acetate, stearate, propionate, hexanoate, octanoate, benzoate, salicylate or cinnamate, or combinations thereof. The preferred metal carboxylate is cobalt, manganese, ruthenium or copper carboxylate. Of these the more preferred is cobalt or manganese carboxylate and the most preferred is cobalt carboxylate. It is present in the overall composition in an amount of from about 0.0001% to about 10% by weight of the weight of the polyamide plus the weight of the diene, preferably from about 0.001% to about 5% by weight of the weight of the polyamide plus the weight of the diene and more preferably from about 0.005% to about 0.5% by weight of the weight of the polyamide plus the weight of the diene. The most preferred range is from about 0.01% to about 0.1% by weight of the weight of the polyamide plus the weight of the diene.

Polyesters of this invention can be prepared by polymerization procedures well-known in the art. As the industry is always advancing, the polyester may be prepared by inventions or innovations not yet known. A traditional way to prepare polyester polymers and copolymers is the melt phase polymerization involving the reaction of a diol with a dicarboxylic acid, or its corresponding ester. Various copolymers of multiple diols and diacids may also be used.

In general, the polyester polymers and copolymers may be prepared, for example, by melt phase polymerization involving the reaction of a diol with a dicarboxylic acid, or its corresponding diester. Various copolymers resulting from use of multiple diols and diacids may also be used. Polymers containing repeating units of only one chemical composition are homopolymers. Polymers with two or more chemically different repeat units in the same macromolecule are termed copolymers. The diversity of the repeat units depends on the number of different types of monomers present in the initial polymerization reaction. In the case of polyesters, copolymers include reacting one or more diols with a diacid or multiple diacids, and are sometimes referred to as terpolymers.

As noted hereinabove, suitable dicarboxylic acids include those comprising from about 4 to about 40 carbon atoms. Specific dicarboxylic acids include, but are not limited to, terephthalic acid, isophthalic acid, naphthalene 2,6-dicarboxylic acid, cyclohexanedicarboxylic acid, cyclohexanediacetic acid, diphenyl-4,4'-dicarboxylic acid, 1,3-phenylenedioxydiacetic acid, 1,2-phenylenedioxydiacetic acid, 1,4-phenylenedioxydiacetic acid, succinic acid, glutaric acid, adipic acid, azelaic acid, sebacic acid, and the like. Specific esters include, but are not limited to, phthalic esters and naphthalic diesters. As explained later, the sulfoisophthalic acids of a metal salt such as lithium, sodium, and calcium are also suitable dicarboxylic acids.

These acids or esters may be reacted with an aliphatic diol preferably having from about 2 to about 24 carbon atoms, a cycloaliphatic diol having from about 7 to about 24 carbon atoms, an aromatic diol having from about 6 to about 24 carbon atoms, or a glycol ether having from 4 to 24 carbon atoms. Suitable diols include, but are not limited to, ethylene glycol, 1,4-butanediol, trimethylene glycol, 1,6-hexanediol, 1,4-cyclohexanedimethanol, diethylene glycol, resorcinol, 1,3-propanediol and hydroquinone.

A useful polyester is a crystallizable polyester with more than 85% of its acid units being derived from terephthalic acid. It is generally accepted that polyesters with greater than 15% comonomer modification are difficult to crystallize. However, this invention includes polyesters which would crystallize and have more than 15% comonomer content. This invention also includes polyesters which do not crystallize and/or have more than 15% comonomer content.

Polyfunctional comonomers can also be used, typically in amounts of from about 0.01 to about 3 mole percent. Suitable comonomers include, but are not limited to, trimellitic anhydride, trimethylolpropane, pyromellitic dianhydride (PMDA), and pentaerythritol. Polyester-forming polyacids or polyols can also be used. Blends of polyesters and copolyesters may also be useful in the present invention.

One suitable crystallizable polyester is polyethylene terephthalate (PET) or a copolymer modified with lithium sulfoisophthalate formed from the di-ester or di-carboxylic acid of lithium sulfoisophthalate in the approximately 1:1 stoichiometric reaction of acids, or their di-esters, with ethylene glycol. Copolymers are also suitable. Specific copolymers and terpolymers of interest are crystallizable polyesters comprising lithium sulfoisophthalate in combinations of isophthalic acid or its diester, 2,6 naphthalate dicarboxylic acid or its diester, and/or cyclohexane dimethanol. The optimal levels of lithium sulfoisophthalate are within the range of 0.1 and 2.0 mole percent based upon the acid moieties in the polymer. While greater than 2.0 mole percent is not deleterious to the increasing the dispersion of the polyamide in the polyester, greater than 2.0 mole percent achieves little or no additional improvement.

The amount of sulfonate, in particular, for example, lithium sulfoisophthalate (derived from 5-sulfoisophthalic acid monolithium salt), is about 0.05 to 10.0 mole percent, with an optimal amount being with the range of about 0.1 to about 2.0 mole percent, with the range of about 0.1 to about 1.1 mole percent being more optimal, and about 0.18 to about 0.74 being even better yet, with the range of about 0.18 to about 0.6 mole percent being the most optimal range.

The esterification or polycondensation reaction of the carboxylic acids or esters with glycol typically takes place in the presence of a catalyst. Suitable catalysts include, but are not limited to, antimony oxide, antimony triacetate, antimony ethylene glycolate, organomagnesium, tin oxide, titanium alkoxides, dibutyl tin dilaurate, and germanium oxide. These catalysts may be used in combination with zinc, manganese, or magnesium acetates or benzoates. Catalysts comprising antimony are preferred.

Another preferred base polyester is polytrimethylene terephthalate (PTT). It can be prepared by, for example, reacting 1,3-propanediol with at least one aromatic diacid or alkyl ester thereof. Preferred diacids and alkyl esters include terephthalic acid (TPA) or dimethyl terephthalate (DMT). Accordingly, the PTT preferably comprises at least about 80 mole percent of either TPA or DMT. Other diols which may be copolymerized in such a polyester include, for example, ethylene glycol, diethylene glycol, 1,4-cyclohexane dimethanol, and 1,4-butanediol. In addition to the ionic compatibilizer such as sulfoisophthalic acid, other aromatic and aliphatic acids which may be used simultaneously to make a copolymer include, for example, isophthalic acid and sebacic acid.

Preferred catalysts for preparing PTT include titanium and zirconium compounds. Suitable catalytic titanium compounds include, but are not limited to, titanium alkylates and their derivatives, titanium complex salts, titanium complexes with hydroxycarboxylic acids, titanium dioxide-silicon dioxide-co-precipitates, and hydrated alkaline-containing titanium dioxide. Specific examples include tetra-(2-ethylhexyl)-titanate, tetrastearyl titanate, diisopropoxy-bis(acetylacetonato)-titanium, di-n-butoxy-bis(triethanolaminato)-titanium, tributylmonoacetyltitanate, triisopropyl monoacetyltitanate, tetrabenzoic acid titanate, alkali titanium oxalates and malonates, potassium hexafluorotitanate, and titanium complexes with tartaric acid, citric acid or lactic acid. Preferred catalytic titanium compounds are titanium tetrabutylate and titanium tetraisopropylate. The corresponding zirconium compounds may also be used.

The polyesters may also contain small amounts of phosphorous compounds, such as phosphates and phosphites, and a catalyst such as a cobalt compound, that tends to impart a blue hue. Also, small amounts of other polymers such as polyolefins can be tolerated in the continuous matrix. Triethyl phosphite is an example of a phosphite.

After completion of the melt phase polymerization, the polymer is either made into a form such as a film or part or stranded and cut into smaller chips, such as pellets. The polymer is usually then crystallized and subjected to a solid phase (solid state) polymerization (SSP) step to achieve the intrinsic viscosity necessary for the manufacture of certain articles such as bottles. The crystallization and polymerization can be performed in a tumbler dryer reactor in a batch-type system. The solid phase polymerization can continue in the same tumble dryer where the polymer is subjected to high vacuum to extract the polymerization by-products Alternatively, the crystallization and polymerization can be accomplished in a continuous solid state polymerization process whereby the polymer flows from one vessel to another after its predetermined treatment in each vessel. The crystallization conditions are relative to the polymer's crystallization and sticking tendencies. However, preferable temperatures are from about 100° C. to about 235° C. In the case of crystallisable polyesters, the solid phase polymerization conditions are generally 10° C. below the melt point of the polymer. In the case of non-crystallisable polyesters, the solid phase polymerization temperature is generally about 10° C. below temperature where the polymer begins sticking to itself. While traditional solid phase polymerization temperatures for crystallisable polymers range from about 200° C. to about 232° C., many operations are from about 215° C. to about 232° C. Those skilled in the art will realize that the optimum solid phase polymerization temperature is polymer specific and depends upon the type and amount of copolymers in the product. However, determination of the optimum solid phase polymerization conditions is frequently done in industry and can be easily done without undue experimentation.

The solid phase polymerization may be carried out for a time sufficient to raise the intrinsic viscosity to the desired level, which will depend upon the application. For a typical bottle application, the preferred intrinsic viscosity (I.V.) is from about 0.65 to about 1.0 deciliter/gram. The time required to reach this I.V. from about 8 to about 21 hours.

In one embodiment of the invention, the crystallizable polyester of the present invention may comprise recycled polyester or materials derived from recycled polyester, such as polyester monomers, catalysts, and oligomers.

The term crystallizable means that the polyethylene terephthalate can be become semi-crystalline, either through orientation or heat induced crystallinity. It is well known that no plastic is completely crystalline and that the crystalline forms are more accurately described as semi-crystalline. The term semi-crystalline is well known in the prior art and is meant to describe a polymer that exhibits X-ray patterns that have sharp features of crystalline regions and diffuse features characteristic of amorphous regions. It is also well known in the art that semi-crystalline should be distinguished from the pure crystalline and amorphous states.

A terephthalate polymer which cannot become crystalline is a non-crystallizable polyester and is also believed suitable to use in this invention.

The preferred amount of polyamide is between 1 and 15 parts per 100 parts of the polyester plus polyamide, preferably between 3 and 8 parts per 100 parts of the polyester plus polyamide, with the most utility occurring between 3 and 7 parts of polyamide per 100 parts of polyester plus polyamide.

It is also preferred that the polyamide contain a stabilizer such as sodium hypophosphite, or other inorganic phosphite stabilizer. Levels of the stabilizer should be between 10 and 500 ppm on the basis of the polyamide. However, the polyamide may also be free of a phosphite stabilizer.

Preferably, the ionic compatibilizer is derived from a co-monomer that has been reacted into the polymer chain. To be a co-monomer, the ionic compatibilizer is functionalized with at least one end group which allows the ionic compatibilizer to react with at least one of the other polymers or polymer co-monomers in the composition.

In the case of polyesters, these can be the polar co-monomers used to create polyester ionomers. In the case of polyamides, the ionic compatibilizer can be the polar co-monomers used to create polyamide ionomers. Examples of these co-monomers are the monovalent and/or divalent salt of the respective sulfonate described in U.S. Pat. No. 6,500,895 (B1) the teachings of which are incorporated herein. Also included are the monovalent and bivalent metal salts described in the following formulas found in Japanese Patent Application 0 3281246 A.

One way to describe the various metal salts is to use the term functionalized metal sulfonate to describe a compound of the form R—SO$_3$M, where M is the metal ion and R is an aliphatic, aromatic, or cyclic compound with at least one functional group that allows the functionalized metal salt to react with the polyester or polyamide, or their respective monomers or oligomers where M designates the metal ion. Functionalized metal sulfonates included in this invention are the lithium, sodium, and potassium salts of sulfonated comonomers, including aliphatic and aromatic alcohols, carboxylic acids, diols, dicarboxylic acids, and multifunctional alcohols, carboxylic acids, amines and diamines. In contrast, non-functional metal sulfonates are those of the R—SO$_3$M, and R does not have functional group. The phrase metal sulfonate therefore refers to both functional and non-functional metal sulfonates. An example of this sulfonated polystyrene or polyolefins which are known to act as ionic compatibilizers in the polyester-polyamide systems.

In general, the ionic compatibilizer is incorporated from a functionalized form of the form X—R, where X is an alcohol, carboxylic acid or epoxy, most preferably a dicarboxylic acid or diol and R is R is —SO$_3$M, —COOM, —OM, —PO$_3$(M)$_2$, with M being a metal in a +1 or +2 valence state which can be selected from the group consisting of Li, Na, Zn, Sn, K and Ca and X—R is copolymerized into the polyester polymer to modify the interfacial tension. The amount of X—R needed will exceed 0.01 mole percent with respect to the total number of respective dicarboxylic acid or diol moles in the polymer composition. It is possible for X—R to include both a diol or dicarboxylic acid. In that case, the mole percent is based upon the total number of moles of respective diols, dicarboxylic acids, or polymer repeating units.

The functionalized ionic compatibilizer may contain 2 or more R groups. R is combined directly to the aromatic ring of X, which could be a diol, a dicarboxylic acid, or a side chain such as a methylene group.

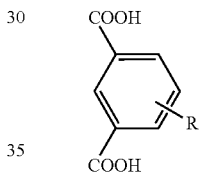

Where R is —SO$_3$M, —COOM, —OM, —PO$_3$(M)$_2$ with M designating a metal in a +1 or +2 valence state which can be selected from the group consisting of Li, Na, Zn, Sn, Ca and K.

The dicarboxylic acids represented by X may be each ortho, meta, or para. They comprise for instance aromatic dicarboxylic acids such as terephthalic acid, isophthalic acid, orthophthalic acid, naphthalene dicarboxylic acid, diphenylether dicarboxylic acid, diphenyl-4,4-dicarboxylic acid etc.

X may also be aliphatic. In that event, aliphatic dicarboxylic acids such as oxalic acid, malonic acid succinic acid, glutaric acid, adipic acid, pimelic acid, suberic acid, azelaic acid, sebacic acid, etc. are suitable. Cycloaliphatic dicarboxylic acids such as cyclohexanedicarboxylic acid and one or more species of these can be used. Also included is isethionic acid. Specifically contemplated are mixtures of the dicarboxylic acids as well.

X can also represent an alcohol, preferably a diol of the structure:

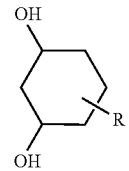

Where R is —SO₃M, —COOM, —OM, —PO₃(M)₂ where M is a metal in a +1 or +2 valence state which can be selected from the group consisting of Li, Na, Zn, Sn, K, and Ca.

The diols represented by X may also be aliphatic glycols such as ethylene glycol, 1,3 propanediol, 1,4-butanediol, 1,5-pentanediol, 1,6-hexanediol, 1,9-nonanediol, diethylene glycol, trimethylene glycol and cycloaliphatic diols such as cyclohexanediol, cyclohexanedimethanol and one or more species in combination can be used. Among these, ethylene glycol, diethylene glycol and cyclohexanediol are preferred.

Other functionalized ionic compatibilizers which can be used include hydroxyl terminated polyethers, such as polyethylene glycol (Carbowax) and cyclic amides such as ethoxylated dimethyl hydantoin. In addition, polyesters can be reacted with epoxy terminated compounds, including epoxy terminated polyethers, to produce a polyether side chain attached to the polymer.

While many metals work and the prior art teaches that bi-metals are preferred, it has unexpectedly been discovered that lithium, a monovalent metal, performs much better than sodium. In fact, the lithium salt produces a dispersion with average domains lower than levels previously measured. As described below, the lithium sulfoisophthalate without a cobalt compound has better colour than the sodium sulfoisophthalate blended with the same amount of MXD6 in the presence of a cobalt salt as described in WO 2005/023530 A1.

The molecular structure of lithium sulfoisophthalic acid is:

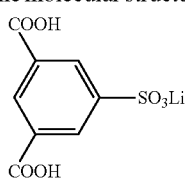

Lithium sulfoisophthalic acid (LiSIPA) or sulfonic acid lithium salt modified isophthalic acid.

As is evident from the above diagram, the lithium sulfoisophthalic acid is a lithium sulfonate and comprises lithium sulfoisophthalate. The lithium sulfoisophthalate refers to the compound as it appears incorporated into the polymer chain. This is also known as the repeating unit of lithium sulfoisophthalic acid. Lithium sulfoisophthalate therefore is the lithium sulfoisophthalic acid less one water molecule, with one hydroxyl group removed from one of the carboxyl end groups and a hydrogen removed from the other carboxyl end group. This molecule is then attached to one or more monomers ($R_1$ and $R_2$) in the polymer backbone.

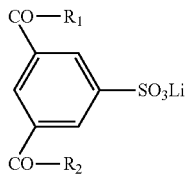

The sulfonate, in this case lithium sulfoisophthalate, is the molecule between the two R groups. Again, R could be the same monomer, in the case of PET, the R's are likely the same being the ethylene glycol moiety as reacted into the polymer chain.

Of the salt forms, the di-carboxylic acid, di-ester, or pre-reacted low molecular weight oligomers such as the bis-hydroxyethyl ester of lithium sulfoisophthalate are preferred. It is also possible that the ionic compatibilizer, in this case the lithium sulfonate, occur in the diol form as well. Possible alternatives are ethylene glycol with the sulfonate group at the end of the pendant chain. It has even been proposed to place the sulfonate at the end of the polyester molecule. This can be accomplished by reacting or copolymerizing the polyester with the sulfonated salt of benzoic acid or other monofunctional species such as isethionic acid, either in the melt reactor or in an extruder.

In order to be reacted into either polymer, the modifying agent must have at least one functional group. These functional groups are carboxylic acid (—COOH), alcohol (—OH), the ester of the carboxylic acid, epoxy termination, the diamine, or amine end groups. Because a high I.V. polyester would have two functional end groups, a high I.V. polyester containing a metal sulfonate in its backbone is an ionic compatibilizer when blended with a polyamide and a polyester that does not contain a metal sulfonate. Should the high I.V. polyester have both ends terminated, it would be considered a non-functionalized ionic compatibilizer.

The non-functionalized ionic compatibilizers are those compounds which contain the polar group, in particular the lithium salt, but do not have any functional end groups which allow the ionic compatibilizer to react with the polyester or polyamide. The lithium salt of sulfonated polystyrene is an example. In the three component system, the mole percent of the ionic compatibilizer is the mole percent based upon all the acid groups of the polyester.

As taught below, the polymer is preferably modified with the ionic compatibilizer. This modification is done by copolymerizing the ionic compatibilizer into the polymer chain.

The composition can exist in a two component form. In the two component form, the ionic compatibilizer is incorporated into the polyester backbone to make the polyester both a polyester and an ionic compatibilizer. Thus the single polyester molecule contains two elements of the claim—a polyester and an ionic compatibilizer.

The composition can also exist with more than two components. For instance, a polyester without the ionic compatibilizer, a polyester with the ionic compatibilizer, and the polyamide.

Levels of the ionic compatibilizer needed to decrease the interfacial tension range from 0.01 mole percent to 15 mole percent with respect to the total number of moles of the respective acid or diol moiety in the composition. For example, a typical homopolymer polyester has 100 mole percent terephthalate derived from terephthalic acid and almost 100 mole percent ethylene derived ethylene glycol, with the remaining glycol being diethylene derived from diethylene glycol which is derived in situ during the manufacturing process. A 100 moles of polymer with 5 mole percent of the ionic dicarboxylic acid co-monomer, such as lithium sulfoisophthalic acid would contain 95 moles of terephthalate derived from terephthalic acid, 5 moles lithium sulfoisophthalate and approximately 100 moles of ethylene derived ethylene glycol. Similarly, it may be advantageous to use another comonomer such as isophthalic acid. For example, if one could substitute 2 moles of the terephthalate with 2 moles of isophthalate and create a polymer with 2 moles isophthalate, 93 moles terephthalate, 5 moles sulfoisophthalate and approximately 100 moles ethylene to make 100 moles of polymer repeat unit.

In the three component blend system, the moles of acid are the moles of acid in the modified polymer plus the moles of acid in the compatable unmodified polymer. For example, if there were two polyesters present, one containing sulfoisophthalate, and the other did not, the mole percent of the sulfoisophthalate would be the moles of sulfoisophthalate divided by the moles of acid moieties of the two polyesters added together.

It is also well known that di-ethylene glycol is formed in-situ in the manufacture of polyester and about 1-3 percent of the total moles of glycol derived repeat unit will be diethylene derived from diethylene glycol. Therefore, the polyester compositions are typically 97 mole percent ethylene and 3 mole percent di-ethylene.

The amount of ionic compatibilizer needed is determined empirically. Generally, a small amount is needed and approaches a critical amount beyond which additional amounts have little or no affect. Unlike other salts, the lithium salt, in particular shows an optimum level at approximately between 0.3 and 1.0 moles per 100 moles polymer repeat unit. This can also be expressed as 0.2 to 1.0 mole percent of the acid or glycol moiety to which the lithium salt is attached.

Polyesters modified with the ionic compatibilizer employed in the present invention can be prepared by polymerization procedures. The traditional techniques can be divided into the ester, acid, and modified processes. In the ester process, the dimethyl ester of the carboxylic acid or acids is reacted with the glycol or glycols in the presence of heat and the methanol removed yielding the bis-hydroxyethyl ester of the acids. The bis-hydroxyethyl ester is then polymerized in its liquid form by subjecting the material to vacuum and heat to remove the glycols and increase the molecular weight. A typical process for the object polymer with an ionic compatibilizer would start with these ratios: 98 moles of dimethyl terephthalate, 2 moles of dimethyl sodium salt of sulfoisophthalate and 220 moles of glycol, typically ethylene glycol. Of the 220 moles of glycol, 120 are excess which are removed during processing. It should be noted that it is possible to obtain the sulfonated co-monomer in either its bis-(hydroxyethyl) or dimethyl ester form.

For clarification, the phrase copolymerized with at least X percent of a specific acid means that the compound is considered as part of the acid group of the polymer, such as terephthalic or isophthalic acid. It provides the reference to determine how many moles of the compound to use. The phrase does not mean that the compound must be added to the process as an acid. For example, lithium sulfoisopthalic acid could be copolymerized into polyethylene terephthalate as the acid with two carboxylic end groups, as the dimethyl ester of the carboxylic acid, as the bis-hydroxy ester of the dimethyl ester, as very low molecular weight oligomers of a glycol acid polymer where the acid moieties are at least in part, the sulfoisophthalate salt, or as the di-alcohol.

The phrase "copolymerized salt of the acid" should not limit the claim to only using the acid form, but should be read to mean that the compound is one of the acid derived groups in the polymer.

The phrase "copolymerized with" means that the compound has been chemically reacted with the polymer, such as in the polymer chain or as a pendant group. For example, a polyester copolymerized with lithium sulfoisophthalate, or modified by copolymerizing at least 0.01 mole percent sulfoisophthalate into the polyester, means that sulfoisophthalate is bonded to the polymer, including bound into the polymer chain, with at least one chemical bond. The phrases are indifferent to how the material is incorporated into the polymer. A polyester copolymerized with lithium sulfoisophthalate, or modified by copolymerizing at least 0.01 mole percent lithium sulfoisophthalate into polyester refers to a polyester containing the lithium sulfoisophthalate whether that lithium sulfoisophthalate was incorporated using but not to limited to lithium sulfoisophthalic acid, lithium sulfobenzoic acid, the dimethyl ester of lithium sulfoisophthalic acid, the methyl ester of lithium sulfobenzoic acid, the di-alcohol of lithium sulfoisophthalate, the lithium sulfohydroxy benzene, the lithium salt of hydroxy benzene sulfonic acid, or oligomers or polymers containing the lithium sulfoisophthalate.

While the preceding paragraph used lithium as an example, the same would be true for the sodium and other metal salts. It should be noted that the references to lithium in this specification should not limit the claims to just the lithium salt.

While lithium is the preferred metal, the use of the polyamides within the specified amino to acid end group ratio has been effectively demonstrated with other metals as demonstrated in the examples.

The phrases "and derivatives" and "and its derivatives" refer to the various functionalized forms of the interfacial reducing agent which can be copolymerized into the polymer. For example, lithium sulfoisophthalate "and its derivatives" refers collectively and is not limited to lithium sulfoisophthalic acid, the dimethyl ester of lithium sulfoisophthalic acid, the bis-hydroxyethyl ester of lithium sulfoisophthalic acid, the di-alcohol of lithium sulfoisophthalate, low molecular weight oligomers, and high I.V. polymers containing lithium sulfoisophthalate in the polymer chain.

The same nomenclature applies to the glycol or alcohol containing the ionic compatibilizer.

In the acid process, the starting materials are the di-carboxylic acids, with water being the primary by-product. The charge ratio in a typical acid process is 98 moles terephthalic acid, 2 moles of a metal salt of sulfoisophthalic acid (e.g. lithium sulfoisophthalic acid —LiSIPA), and 120 moles of glycols, typical ethylene glycol. After reaction of the glycols with the acids, the material is subjected to the same polymerization process conditions as the ester process. In practice, the many of the salts degrade and are therefore added in as a pre-reacted bis-hydroxy ester form as described in the examples.

The modified processes are variations of either process; combining the intermediary product at certain steps. For example, the acid process may be used with just terephthalic acid to produce its low molecular weight intermediate and the ester process used to produce the bis-hydroxyethyl ester of the homopolymer sulfonated polyester. These two intermediates are then combined and polymerized to a more random copolymer. Another variation is to add the finished modified polymer to the melt reactor and let the melt process depolymerise the modified polymer and then form a random copolymer. While the three component system, of PET, PET-ionomer, and polyamide has not been found to be as effective as the more random copolymer of the two component system (PET-ionomer, polyamide), the three component system is considered a part of this invention.

Another technique for manufacturing the modified polymer is to completely trans-esterify a modified polyester with a large amount of ionic compatibilizer moieties into a unmodified polyester to create a blockier copolymer. This can be done using other techniques such as a long residence time and/or high temperature extrusion.

Other methods of incorporating similar co-monomers are provided in U.S. Pat. Nos. 3,936,389, 3,899,470, 5,178,950, and United States Statutory Invention Registration H1760.

In the process of making the composition, the polyester, polyamide, and ionic compatibilizer are melt blended by any of the known techniques and then molded, formed or cast into an article. Melt blending involves heating the separate materials so that at least the polyester and the polyamide are liquid and exposing the liquids to shear stress. This can occur in an extruder or a heated vessel and can be done continuously or in a batch operation. If the ionic compatibilizer is not bound into the polyamide or polyester, the temperature should be sufficient to liquefy it as well. The actual blending could occur in a stirred vessel or extruder, such as injection molding machine. After the material is melt blended it is shaped into an article.

Examples of the articles are films, fibers, pellets, preforms, and injection molded shapes. Often these articles are further treated to make a different article such as a bottle, container, tray, or stretched film. In some cases, the composition is introduced as a layer in the article and becomes a layer in the final produced article.

To make the article, the melt blend will pass through a nozzle or die. In the case of films or sheets, the blended composition is pushed through a die and usually onto a roll. In the case of a preform or injection molded part, the melt blended composition is pushed into the mold and takes the shape of the mold. In the case of the pellet, the melt blended composition is pushed through a hole making a strand that is cut. In the case of the fiber, the strand remains uncut and is wound onto a bobbin.

Because the polyamide and polyester are both hydroscopic, it is preferable to dry both of them prior to melt blending. In general, the amount of moisture contained by the materials to be blended should not exceed 30 ppm water on the basis of the total amount of polyester in composition when melt blending.

Experimental Work:

Ricon® 131MA5, available from Sartomer, and Lithene® N4-5000-5MA, available from Synthomer, are both polybutadiene (PBD) oligomers modified with maleic anhydride, and were used in these experiments. The properties are shown in Table 1.

To produce these modified materials, different nylons were compounded with the PBD's (dienes) in a Werner ZSK-30 twin screw extruder. Extrusion conditions and nylon/PBD compositions are displayed in Table 2. Different types of nylon were tested, including aliphatic (nylon 6 and 66) and MXD6-like nylons. Table 3 shows the characteristics of nylons employed.

TABLE I

MALEIC ANHYDRIDE MODIFIED PBD

| Property | RICON® 131MA5 | LITHENE® N4-5000-5MA |
|---|---|---|
| Mn (Number Average Molecular Weight) | 4700 | 5250 |
| Average Anhydride Groups per chain | 2 | 2.5 |
| Viscosity at 25° C. (poise) | 15000 | 12000 |
| Viscosity at 50° C. (poise) | — | 3000 |
| Vinyl - 1,2 | 18-33 | 10-20 |
| Trans - 1,4 | NI | 50-60 |
| Cis - 1,4 | NI | 25-35 |
| Supplier | Sartomer | Synthomer |

TABLE 2

NYLON/PBD BLENDS

| ID | PBD | % PBD | Base Resin | T (° C.) @ exit | Kg/h | Rpm under Vacuum |
|---|---|---|---|---|---|---|
| SC V05 | Ricon® 131MA5 | 10 | PET VFR 10538 | 265 | 3 | 100 |
| SC V42B | Ricon® 131MA5 | 5 | MXD6 6007 | 150/250 | 4 | 150 |
| SC V58 | Ricon® 131MA5 | 5 | PA 6 Radilon S | 240 | 4 | 150 |
| SC V59 | Ricon® 131MA5 | 2 | MXD6 6007 | 260 | 6 | 150 |
| SC V86 | Lithene® N4 5000 5MA | 6 | Radilon S NH 6, 6 | 260 | 6 | 150 |
| SC V87 | Lithene® N4 5000 5MA | 6 | Radilon S Natural 6 | 260 | 6 | 150 |
| SC V88 | Ricon® 131MA5 | 5 | MXD6 Ultramid X17 | 260 | 6 | 150 |

TABLE 3

Nylon characteristics

| Nylon grade | Nylon type | RV | AEG (meq/kg) | CEG (meq/kg) | Supplier |
|---|---|---|---|---|---|
| Radilon S | PA 6 | 2.6 | 55 | 55 | Radici |
| Radilon A-NH | PA 66 | 2.6 | 80 | 28 | Radici |
| Ultramid X-17 | MXD-6 | 1.74 | 6 | 195 | BASF |
| MXD6-6007 | MXD-6 | 2.7 | 18 | 64 | Mitsubishi |

For the production of active barrier bottles, modified nylons were blended with PET and Co salts directly in an Arburg injection machine. Sample preparation involved pellets mixing (PET and modified nylon), addition of 0.05% of mineral oil and finally the desired amount of Co Neodecanoate (20% Co, from Shepherd). In general, the PET employed was nominally 2 mole % LiSIPA high 0.84 dl/g IV resin. The comparative examples used an isophthalic modified PET copolymer having an 0.80 dl/g IV.

The 28 g preforms were blown into 500 ml straight wall bottles. The bottles were submitted to Fibox for oxygen barrier evaluation. The Fibox is a test method which measures the amount of dissolved oxygen in the liquid. Low permeation rates are associated with low amounts of dissolved oxygen over time.

The composition of the preforms are noted in Table 4.

TABLE 4

PREFORM AND BOTTLE COMPOSITION

| ID | PET type | Nylon Type | Additive From Table 2 | Cobalt |
|---|---|---|---|---|
| 1000-4 C-1 | Iso modified PET | — | — | — |
| 1016-4 C-2 | Iso modified PET | 7%, MXD6 6007 | | |
| 1293-1 C-3 | 2% LiSIPA modified PET | 3% MXD6 6007 | | 100 ppm |
| 1189-1 C-4 | Iso modified PET | | 1.5% SCV05 | 100 ppm |
| 1157-5 W-1 | 2% LiSIPA modified | | 3% SCV58 | 100 ppm |
| 998-3 W-2 | 2% LiSIPA modified PET | | 3% SCV42B | 100 ppm |

TABLE 4-continued

PREFORM AND BOTTLE COMPOSITION

| ID | PET type | Nylon Type | Additive From Table 2 | Cobalt |
|---|---|---|---|---|
| 1157-6 W-3 | 2% LiSIPA modified PET | | 3% SCV59 | 100 ppm |

C = Comparative Example, W = Working Example

Analysis of Results:

FIG. 1 shows the Fibox results for nylons Radilon® S (PA 6) and MXD6 6007 modified with minor amounts of PBD, plus 100 ppm of Co. Some comparative passive and active barrier materials were included for comparison.

Samples 998-3 and 1157-6 have outstanding performance, with zero oxygen permeation rate since the first day. Both these bottles were made with 3% MXD6-6007, containing 5% and 2% of PBD respectively, as calculated over nylon content (corresponding to 0.15% and 0.06% of total PBD in the preform).

Sample 1157-5, containing 3% of PA6 modified with PBD (5% over nylon; 0.15% total has a much lower permeation rate than the sample prepared with PBD only or a passive barrier with 7% 6007.

Figure 2:
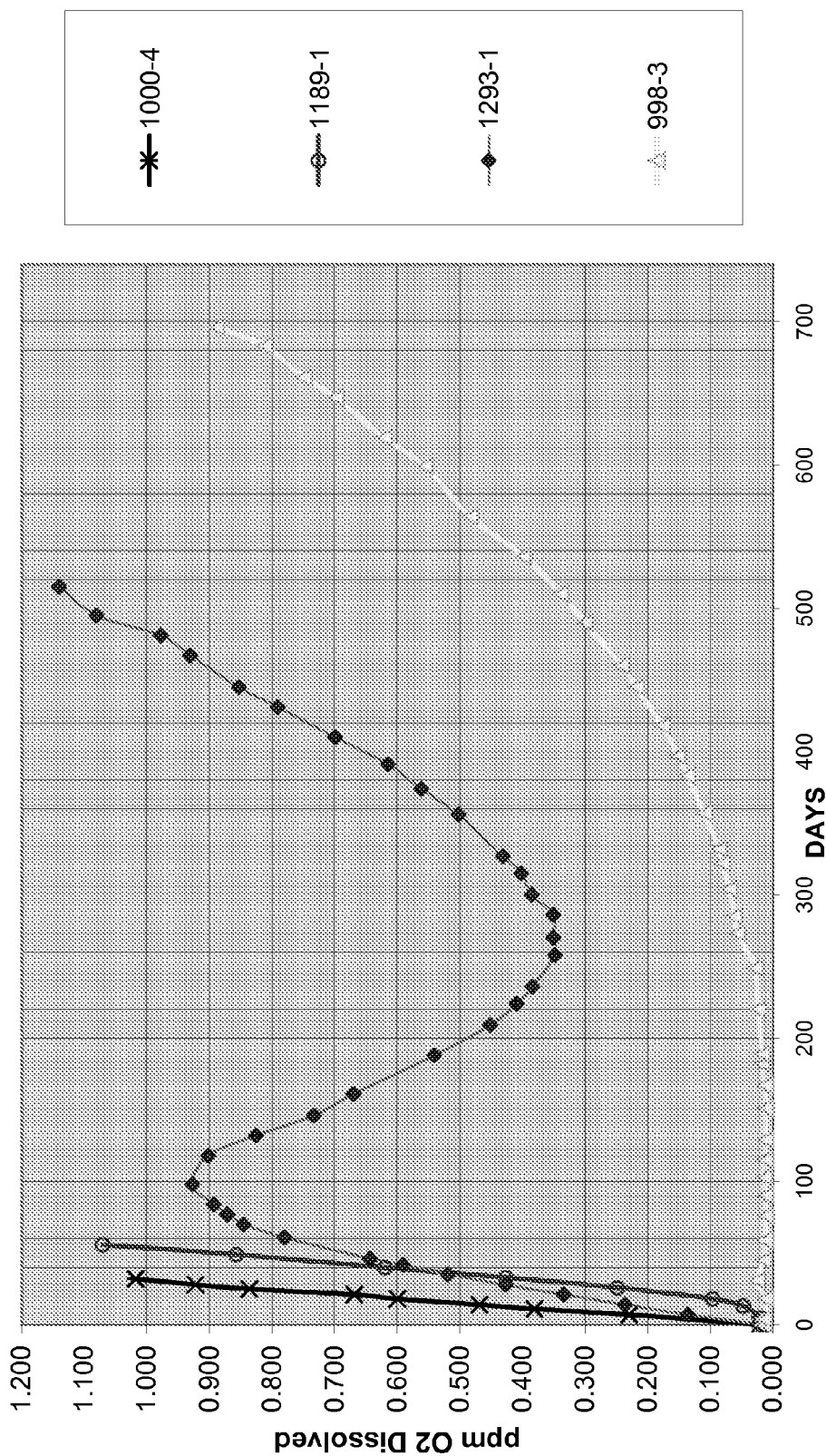
FIG. 2. is a chart showing the amount of oxygen ingress into a package made with various embodiments of the invention and controls.

FIG. 2 compares Fibox results of 3% 6007 bottles, with and without PBD, produced strictly under the same conditions, together with some other samples for comparison—including one containing PBD/Co without any nylon.

The typical induction behavior of a low nylon content bottle, with Co Neodecanoate, is seen for the sample 1293-1 (without PBD). In this case only after about 100 days, and an overshoot of 0.9 ppm, scavenging system became active enough to reduce the oxygen concentration inside the bottle. In about 480 days the oxygen concentration reached 1 ppm. For the sample with PBD and the same amount of 6007/Co (998-3), there is no oxygen ingress at all for about 250 days, reaching 1 ppm in just over 700 days. The synergy between MXD6 and PBD in the presence of the ionic compatibilizer, LiSIPA is evident, since the result is not what we would expect by just adding the individual performances of PBD and MXD6.

We claim:

1. A container comprising a polyamide, a polydiene compound, a transition metal compound, and a polyester comprising an ionic compatibilizer; and wherein the ratio of the amount of polyamide to the polydiene compound is in the range of 4:1 and 1000:1 and the polydiene has functional groups and at least some of these groups have reacted with the polyamide.

2. The container of claim 1, wherein the container comprises a stretched wall.

3. The container of claim 1, wherein the ionic compatibilizer is a sulfonated comonomer having an —$SO_3M$ group with M being a metal in a +1 or +2 valence state selected from the group consisting of Li, Na, Zn, Sn, Ca and K.

4. The container of claim 1, wherein the polyamide is poly(m-xylylene adipamide).

5. The container of claim 1, wherein the ionic compatibilizer is a sulfonated comonomer having an —$SO_3M$ group with M being a metal in a +1 or +2 valence state selected from the group consisting of Li, Na, Zn, Sn, Ca and K; and wherein the polyamide is poly(m-xylylene adipamide).

6. The container of claim 1, wherein the metal of the transition metal compound is cobalt.

7. The container of claim 5, wherein the metal of the transition metal compound is cobalt.

8. The container of claim 2, wherein the ionic compatibilizer a sulfonated comonomer having an —$SO_3M$ group with M being a metal in a +1 or +2 valence state selected from the group consisting of Li, Na, Zn, Sn, Ca and K.

9. The container of claim 2, wherein the polyamide is poly(m-xylylene adipamide).

10. The container of claim 2, wherein the ionic compatibilizer is a sulfonated comonomer having an —$SO_3M$ group with M being a metal in a +1 or +2 valence state selected from the group consisting of Li, Na, Zn, Sn, Ca and K; and wherein the polyamide is poly(m-xylylene adipamide).

11. The container of claim 2, wherein the metal of the transition metal compound is cobalt.

12. The container of claim 10, wherein the metal of the transition metal compound is cobalt.

* * * * *